US012768662B2

(12) United States Patent
Diamond et al.

(10) Patent No.: US 12,768,662 B2
(45) Date of Patent: Oct. 20, 2026

(54) ROUTE PLANNING SYSTEM AND METHOD

(71) Applicant: Ford Global Technologies, LLC, Dearborn, MI (US)

(72) Inventors: Brendan Diamond, Grosse Pointe, MI (US); Keith Weston, Canton, MI (US); Andrew Denis Lewandowski, Sterling Heights, MI (US); Jordan Barrett, Milford, MI (US); Stuart C. Salter, White Lake, MI (US)

( * ) Notice: Subject to any disclaimer, the term of this patent is extended or adjusted under 35 U.S.C. 154(b) by 106 days.

(21) Appl. No.: 18/537,000

(22) Filed: Dec. 12, 2023

(65) Prior Publication Data

US 2025/0189323 A1 Jun. 12, 2025

(51) Int. Cl.
*G01C 21/34* (2006.01)
*G01C 21/36* (2006.01)

(52) U.S. Cl.
CPC ..... *G01C 21/3461* (2013.01); *G01C 21/3492* (2013.01); *G01C 21/3694* (2013.01)

(58) Field of Classification Search
CPC ............ G01C 21/3461; G01C 21/3492; G01C 21/3694
USPC ...................... 701/423, 553, 48, 533; 705/28
See application file for complete search history.

(56) References Cited

U.S. PATENT DOCUMENTS 11,175,153 B2 * 11/2021 Pham ..................... G08G 1/005
11,287,270 B2 3/2022 Xiang et al.
11,680,801 B2 6/2023 Benou et al.
2010/0268450 A1 * 10/2010 Evanitsky .......... G01C 21/3423 701/533
2014/0129139 A1 * 5/2014 Ellison ............... G06Q 30/0251 701/533
2017/0232915 A1 * 8/2017 Dufford ............... G01C 21/343 701/48

(Continued)

FOREIGN PATENT DOCUMENTS

CN 115380196 A * 11/2022 ............ B60W 40/06
DE 102021104185 A1 8/2021

OTHER PUBLICATIONS

FarEye, What is GPS Route Planning? How it Works, Benefits and Key Aspects, 2023 (Year: 2023).*

(Continued)

*Primary Examiner* — Tarek Elchanti
(74) *Attorney, Agent, or Firm* — Joseph Zane; Eversheds Sutherland (US) LLP

(57) ABSTRACT

A route planning system is disclosed. The system may include a memory, a transceiver and a processor. The memory may store historical information associated with counts of users of interest in a geographical area. The transceiver may receive user inputs and information associated with counts of interface locations in the geographical area. The processor may determine a set of potential routes between source and destination locations based on the user inputs. The processor may further estimate counts of users of interest and interface locations in each potential route based on the historical information and the information associated with the counts of interface locations. The processor may further calculate a route score for each potential route based on the counts of users of interest and interface locations in each potential route. The processor may further determine and output a recommended route based on the route score and the user inputs.

19 Claims, 4 Drawing Sheets

(56) References Cited

U.S. PATENT DOCUMENTS

| | | | | |
|---|---|---|---|---|
| 2019/0228375 | A1* | 7/2019 | Laury ................ | G06Q 10/0836 |
| 2023/0111458 | A1* | 4/2023 | Chan .................. | G06Q 10/0836<br>705/28 |
| 2023/0400314 | A1* | 12/2023 | Beaurepaire ....... | G01C 21/3811 |

OTHER PUBLICATIONS

Mate Szarvas, et al., Real-Time Pedestrian Detection Using Lidar and Convolutional Neural Networks, Intelligent Vehicles Symposium, Jun. 13-15, 2006, pp. 213-218.

Chaochun Yuan, et al., Vehicle Path Planning Based on Pedestrian Collision Avoidance Action, IEEE Access, DOI 10.1109/ACCESS.2023.3287937, Jan. 2023, pp. 1-18.

* cited by examiner

ROUTE PLANNING SYSTEM AND METHOD

FIELD

The present disclosure relates to a system and method for planning a route for a vehicle that may potentially minimize interaction with walkers and bikers.

BACKGROUND

Vehicle navigation systems enable vehicle users to conveniently travel from respective source locations to destination locations. Most modern navigation systems provide turn-by-turn navigation instructions to the users, which facilitate the users in conveniently driving their vehicles. Modern navigation systems also recommend optimum travel routes to the users that ensure least travel time or least traffic, thereby facilitating the users to efficiently drive their vehicles from respective source locations to destination locations.

While such navigation systems do provide benefits to the users, there may be instances where the users may desire additional assistance from the navigation systems.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
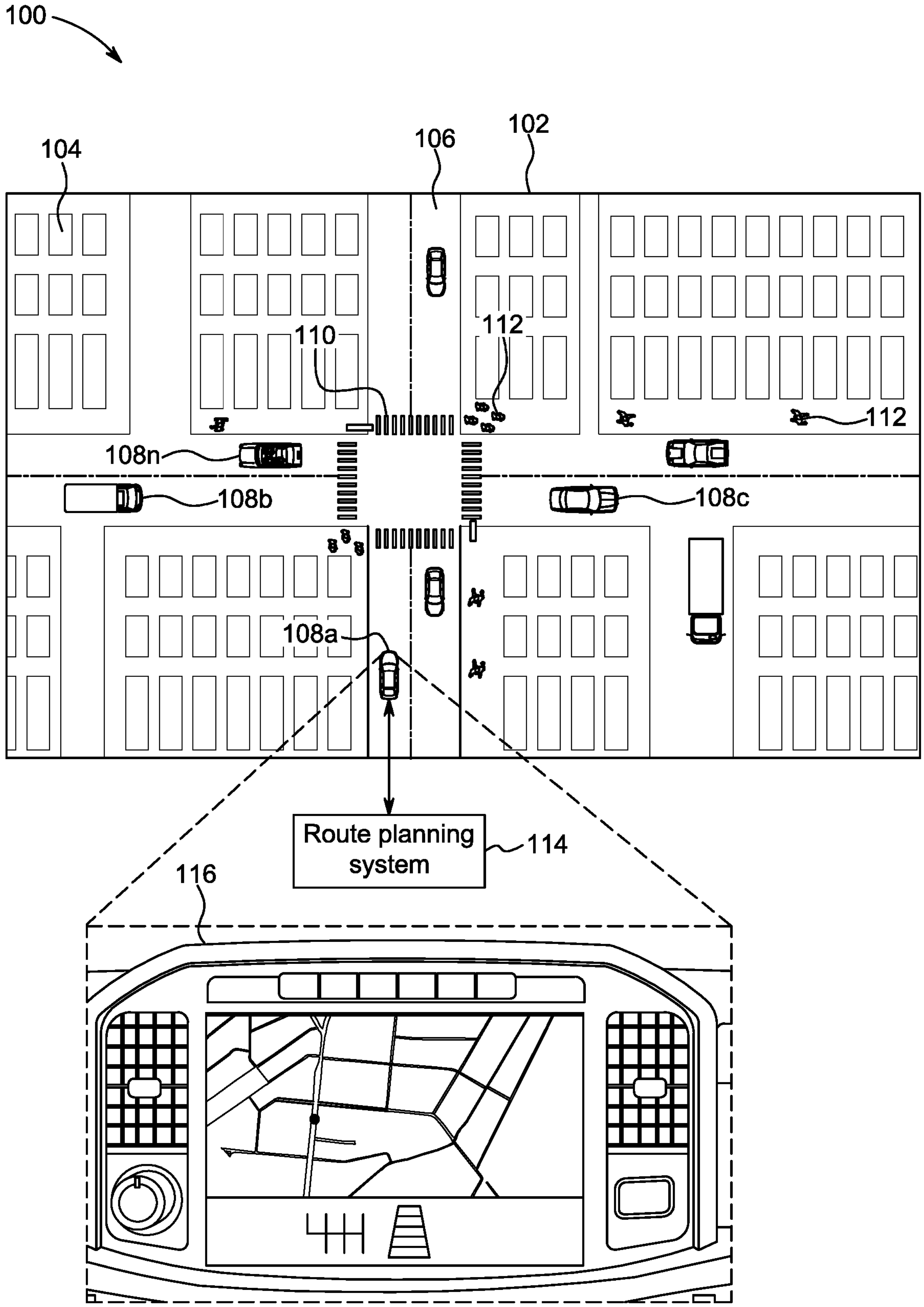
FIG. 1 depicts an example environment in which techniques and structures for providing the systems and methods disclosed herein may be implemented.

The present disclosure describes a route planning system and method that determines a travel route for a vehicle user that may potentially minimize probability of vehicle interaction with walkers and/or bikers (collectively referred to as "users of interest"). The route planning system ("system") may be part of a vehicle associated with the vehicle user or a server. The system may be communicatively coupled with a plurality of vehicles located in a geographical area, and sensor suites installed in buildings/infrastructure in the geographical area. The system may use the data/information obtained from the plurality of vehicles and the sensor suites, and inputs obtained from the vehicle user to recommend a travel route to the vehicle user that may potentially minimize the probability of vehicle interaction with the users of interest.

To obtain information associated with the travel route from the system, the vehicle user may transmit (e.g., via a user device or a vehicle Human-Machine Interface (HMI)) user inputs to the system. The user inputs may include, for example, a request to identify a route that may potentially minimize the probability of vehicle interaction with the users of interest, a destination location where the vehicle user desires to reach, and an acceptable additional distance or travel time that the vehicle user may be willing to traverse/spend while driving from the vehicle user's current location to the destination location to potentially minimize the probability of vehicle interaction with the users of interest. Responsive to receiving the user inputs from the vehicle user, the system may determine a set of potential routes between the vehicle user's current location and the destination location.

The system may further estimate a count of users of interest and a count of interface locations (e.g., sidewalks, walker crossings, bike lanes, and/or the like) in each potential route based on real-time data obtained from vehicles in the geographical area (e.g., via vehicle-to-vehicle communication), sensor suites installed in the buildings/infrastructure in the geographical area (e.g., via vehicle-to-infrastructure communication), user devices associated with the users of interest, and/or the like. In further aspects, the system may estimate the count of users of interest in each potential route based on historical information associated with the count of users of interest in the geographical area at different times of the day, times of the year, temperature conditions, weather conditions, and/or the like, and information associated with driving behavior of the vehicles in the geographical area.

Responsive to estimating the counts of users of interest and interface locations in each potential route, the system may calculate a route score of each potential route based on the calculated counts of users of interest and interface locations. The system may further identify a recommended route, from the set of potential routes, which may have the least route score and may satisfy the acceptable additional distance or travel time criterion provided by the vehicle user. The system may additionally output the recommended route to the vehicle user via the user device and/or the vehicle HMI.

The present disclosure discloses a route planning system and method that determines a travel route for a vehicle user that potentially minimizes a probability of vehicle interactions with walkers, bikers, or users on non-standard vehicles that may impede traffic flow (e.g., motorcycles, scooters, snowmobiles, slow-moving street sweepers), etc. Since the travel route potentially minimizes the probability of vehicle interactions with the walkers, bikers, users on non-standard vehicles, etc., the vehicle user may conveniently drive the vehicle. Further, the travel route may not require the vehicle user to drive a substantial additional distance over the shortest possible route or drive for a substantially longer time duration over the fastest possible route, thereby enhancing user convenience while driving the vehicle.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example environment 100 in which techniques and structures for providing the systems and methods disclosed herein may be implemented. The environment 100 may include a geographical area 102 including a plurality of buildings, shops, schools, malls, etc. (collectively referred to as buildings 104) and a road network 106 on which a plurality of vehicles 108*a*, 108*b*, 108*c*, 108*n* (collectively referred to as vehicles 108) may be travelling or parked. Each vehicle 108 may take the form of any passenger or commercial vehicle such as, for example, a car, a work vehicle, a crossover vehicle, a truck, a van, a minivan, a taxi, a bus, etc. Further, each vehicle 108 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc.

The geographical area 102 may further include one or more interface locations 110 that may be disposed on or in proximity to one or more roads on the road network 106. The interface locations 110 may be, for example, sidewalks, walker crossings, bike lanes, and/or the like. In some aspects, the interface locations 110 may be those locations on the road network 106 that may enable walkers 112 to conveniently walk alongside the roads or cross the roads on the road network 106, and/or enable bikers (not shown) to conveniently travel on the roads. Stated another way, the interface locations 110 may be those location on the road network 106 where a density of users/people not in a vehicle (e.g., walkers, bikers, etc.) may be expected to be high. In the present disclosure, the users/people not in a vehicle on the road network 106 are collectively referred to as "users of interest" or users 112. In further aspects, the users of interest may be users on non-standard vehicles that may impede traffic flow, e.g., motorcycles, scooters, snowmobiles, slow-moving street sweepers, etc.

Figure 2:
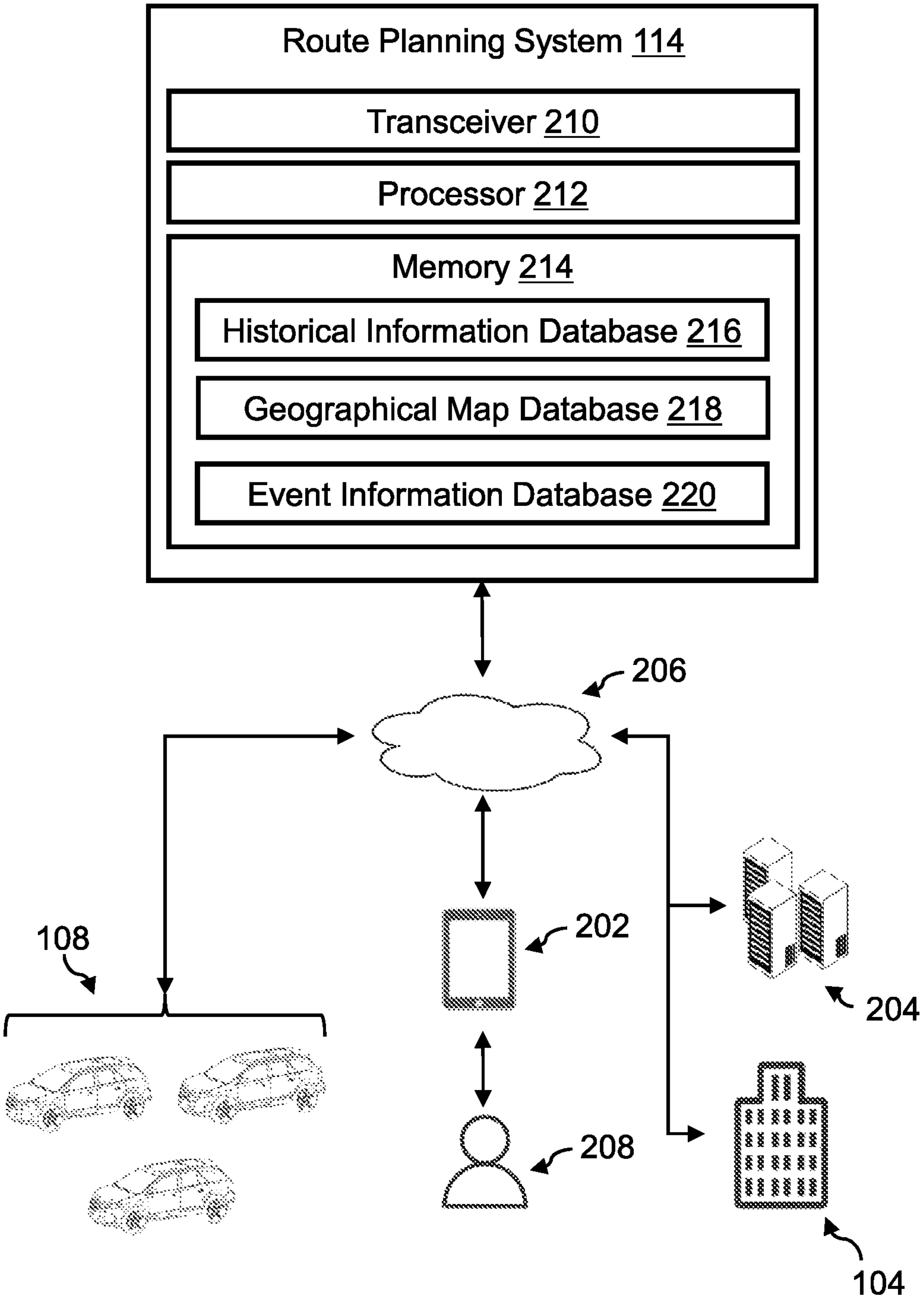
FIG. 2 depicts a block diagram of a route planning system in accordance with the present disclosure.

The environment 100 may further include a route planning system 114 (or system 114) that may be configured to determine and recommend a route from a source location to a destination location to a vehicle user (e.g., a user associated with the vehicle 108*a*, shown as vehicle user 208 in FIG. 2). In some aspects, the system 114 may be part of a vehicle, e.g., the vehicle 108*a*, as shown in FIG. 1. In other aspects, the system 114 may be part of a server (not shown), and accessible by the vehicle user via, e.g., a user device (shown as user device 202 in FIG. 2) or a vehicle Human-Machine Interface 116 (or HMI 116).

Although the system 114 is shown to be communicatively connected with the vehicle 108*a* in FIG. 1, in some aspects, the system 114 may additionally be communicatively connected with a plurality of units including, but not limited to, the vehicles 108 on the road network 106, one or more buildings 104 (specifically, sensor suites installed on the buildings 104), user devices associated with the users 112, one or more servers, infrastructure sensor suites installed in the geographical area 102 (e.g., via Internet of Things (IoT) technologies), user devices associated with vehicle users of the vehicles 108, and/or the like. In some aspects, when the system 114 may be part of the vehicle 108*a*, the system 114 may be communicatively connected with other vehicles 108 on the road network 106 via vehicle-to-vehicle (V2V) communication, and with building sensor suites and/or infrastructure sensor suites via vehicle-to-infrastructure (V2I) communication.

The system 114 may be configured to determine and recommend the travel route to the vehicle user (e.g., the user associated with the vehicle 108*a*) when the vehicle user transmits a request to the system 114 to identify the travel route. The vehicle user may transmit the request to the system 114 via the user device or the HMI 116. In some aspects, the vehicle user may transmit the request to the system 114 when the vehicle user desires the system 114 to identify a travel route that may potentially minimize interaction with the users 112 when the vehicle user drives the vehicle 108*a* from a vehicle current location (or a source location) to a destination location. Stated another way, the identified travel route for the vehicle user may that route between the source and destination locations that may potentially minimize a probability of vehicle interaction with the users 112. In some aspects, the vehicle user may desire to minimize the probability of vehicle interaction with the users 112 to minimize chances of any adverse situation associated with the users 112, when the vehicle user drives the vehicle 108*a* from the source location to the destination location.

In addition to the request to identify the travel route, the vehicle user may transmit to the system 114 (via the user device or the HMI 116) information associated with the destination location (e.g., the destination location address) and a maximum additional travel distance or time duration the vehicle user may be willing to accept on the travel route to potentially reduce the probability of vehicle interaction with the users 112. As an example, the vehicle user may indicate to the system 114 that the vehicle user may be willing to travel up to 10-20% more (or 10 miles more) than the shortest distance between the source and destination locations and/or spend up to 10-20% more time (or 20 minutes) than the fastest travel route between the source and destination locations on a travel route recommended by the system 114 if the recommended travel route potentially minimizes the probability of vehicle interaction with the users 112.

Responsive to receiving the request and the additional information described above from the vehicle user, the system 114 may determine the vehicle's current location (or the source location) via a Global Positioning System (GPS) receiver associated with the vehicle 108*a* or a real-time geolocation of the user device associated with the vehicle user. The system 114 may further receive real-time and/or historical information associated with vehicle traffic on a plurality of routes in the geographical area 102, weather conditions, real-time geolocations associated with the users 112, counts and locations of interface locations (e.g., the interface locations 110) on the plurality of routes, and/or the like, which may enable the system 114 to determine and recommend the travel route to the vehicle user. Examples of information received and used by the system 114 to determine and recommend the travel route are described below. The examples described below should not be construed as limiting, and the system 114 may use additional information to determine the travel route, without departing from the present disclosure scope.

In some aspects, the system 114 may receive information associated with counts of interface locations (e.g., the interface locations 110) on the plurality of routes in the geographical area 102 from one or more servers. In other aspects, the information associated with the counts of interface locations 110 in the geographical area 102 may be pre-stored in a system memory (shown as memory 214 in FIG. 2). In further aspects, the system 114 may receive the information associated with the counts of interface locations 110 in the geographical area 102 from other vehicles 108 (e.g., via V2V communication) and/or the buildings 104 or infrastructure sensor suites (e.g., via V2I communication). A person ordinarily skilled in the art may appreciate that a density of the users 112 (or "walker/biker density") may be higher in areas proximate to the interface locations 110.

In further aspects, the system 114 may additionally or alternatively receive information associated with planned events (e.g., farmer markets, bike events, marathons, concerts, shows, movies, sport events, etc.) in the geographical area 102 at the time of receiving the request from the vehicle user, and counts and locations of exercise routes or tracks and/or bike lanes in the geographical area 102. The system 114 may receive such information from one or more servers. A person ordinarily skilled in the art may appreciate that the walker/biker density may be higher in the areas proximate to the locations where the planned events may be taking place, or in the areas in proximity to the exercise routes or tracks and/or the bike lanes.

In further aspects, the system 114 may additionally or alternatively receive real-time geolocations associated with the users 112 from respective user devices (directly or via one or more servers). In some aspects, if a movement speed of a user may be less than a predefined threshold (e.g., 2 miles per hour), the system 114 may determine/predict that the user may not be travelling in a vehicle, and hence may be a user of interest or the user 112. The system 114 may also determine whether one or more users 112 may be jogging or performing exercise in proximity to the plurality of routes in the geographical area 102, based on inputs obtained from health or fitness applications that may be installed on the user devices associated with the users 112. The system 114 may additionally obtain typical or historical exercise schedules associated with the users 112 in proximity to the plurality of routes in the geographical area 102, based on the inputs obtained from the health or fitness applications.

In further aspects, the system 114 may additionally or alternatively receive information associated with presence of the users 112 (or "user presence") on the plurality of routes in the geographical area 102 from other vehicles 108 (e.g., via V2V communication and vehicle cameras/sensors) and/or the buildings 104 or infrastructure sensor suites (e.g., via V2I communication). The system 114 may also receive the information associated with the user presence on the plurality of routes in the geographical area 102 from one or more social networking applications that may be installed in the user devices associated with the users 112. In an exemplary aspect, the system 114 may determine that a party or a get-together may be planned in proximity to the plurality of routes in the geographical area 102 (and hence may have a higher walker/biker density), when the information received from the social networking applications indicates that the party/get-together is planned at the same time as the vehicle user transmits the request to identify the travel route to the system 114.

In further aspects, the system 114 may additionally or alternatively receive information associated with driving behavior associated with the vehicles 108 (e.g., via V2V or V2I communication, or via information received from one or more servers) on the plurality of routes in the geographical area 102. In some aspects, if a vehicle (e.g., the vehicle **108*b*) may be travelling slowly (e.g., less than a predefined speed threshold), as determined from the information associated with the driving behavior of the vehicle 108*b*, the system 114 may determine/predict that the road on which the vehicle 108*b*** may be travelling may have a higher walker/biker density.

In further aspects, the system 114 may additionally or alternatively receive historical information associated with counts of the users 112 on the plurality of routes in the geographical area 102 at different times of the day, different times of the year, different temperature and/or weather conditions, and/or the like, from one or more servers. The system 114 may correlate the historical information with a time of the day/year and/or weather/temperature conditions when the vehicle user transmits the request to the system 114, to estimate the counts of the users 112 on the plurality of routes in the geographical area 102 at the time of receiving the request from the vehicle user.

Although the description above describes an aspect where the system 114 receives the historical information from one or more servers, in some aspects, such historical information may also be pre-stored in the system memory.

Responsive to receiving/obtaining the plurality of information described above, the system 114 may first determine a set of potential routes, from the plurality of routes in the geographical area 102, which may connect the source location to the destination location. The system 114 may then estimate a count of the users 112 and a count of the interface locations 110 in each potential route, from the set of potential routes, based on one or more information (described above) received by the system 114. Responsive to estimating the counts of the users 112 and the interface locations 110 in each potential route, the system 114 may calculate a "route score" for each potential route based on the estimated counts of the users 112 and the interface locations 110. In some aspects, a higher route score may indicate that the probability of vehicle interaction with the users 112 may be potentially higher on the route, and a lower route score may indicate that the probability of vehicle interaction with the users 112 may be potentially lower on the route. Example mathematical expression associated with the route score is described later below in conjunction with FIG. 2.

Responsive to calculating the route score for each potential route, the system 114 may further estimate a travel time duration and a travel distance associated with each potential route, based on real-time traffic information and geographical distance information associated with the set of potential routes that the system 114 may receive from one or more servers, other vehicles 108 (e.g., via V2V communication) and/or the buildings 114/infrastructure (e.g., via V2I communication). The system 114 may further determine a recommended potential route, from the set of potential routes, which has the lowest route score and associated travel distance and/or time duration meets the user preference/criterion for the maximum acceptable additional travel distance or time duration the vehicle user may be willing to accept on the travel route. For example, if the vehicle user is willing to travel not more than 10 miles extra on a travel route to minimize the probability of vehicle interaction with the users 112, the system 114 may determine a route, from the set of potential routes, as the recommended potential route that does not require the vehicle user to travel more than 10 miles extra over the shortest route connecting the source and destination locations, and that has the lowest route score.

Responsive to determining the recommended potential route, the system 114 may output information associated with the recommended potential route to the vehicle user via the user device or the HMI 116. The information associated with the recommended potential route may include, for example, a geographical map depicting the recommended route, turn-by-turn instructions associated with the recommended route to enable the vehicle user to conveniently drive the vehicle **108*a*** from the source location to the destination location, and/or the like.

Further system details are described below in conjunction with FIG. 2.

While the present disclosure assumes a driver routing to potentially minimize interaction with walkers and bikers, it would be obvious to someone skilled in the art that the same system may be used by walkers and bikers (or other users on non-standard vehicles) to potentially minimize interaction with vehicles.

The vehicles 108 and the system 114 implement and/or perform operations, as described here in the present disclosure, in accordance with the owner manual and safety guidelines. In addition, any action taken by the vehicle user based on the recommendations or notifications provided by the vehicles 108 and/or the system 114 should comply with all the rules specific to the location and operation of the vehicles 108 (e.g., Federal, state, country, city, etc.). The recommendations or notifications, as provided by the vehicles 108 and/or the system 114 should be treated as suggestions and only followed according to any rules specific to the location and operation of the vehicles 108.

FIG. 2 depicts a block diagram of the route planning system 114 (or system 114) in accordance with the present disclosure. While describing FIG. 2, references will be made to FIG. 3. As described above, in some aspects, the system 114 may be part of a vehicle (e.g., the vehicle 108*a*). In other aspects, the system 114 may be part of a server.

The system 114 may be communicatively coupled with the vehicles 108, the buildings 104 (specifically the sensor suites installed at the buildings 104), a user device 202 and one or more servers 204 (or server 204) via one or more networks 206 (or network 206). The user device 202 may be associated with a vehicle user 208 (who may be associated with the vehicle 108*a*), and may include, for example, a mobile phone, a laptop, a computer, a tablet, a wearable device, or any other similar device with communication capabilities.

The server 204 may be part of a cloud-based computing infrastructure and may be associated with and/or include a Telematics Service Delivery Network (SDN) that provides digital data services to the vehicles 108 and/or the system 114. In further aspects, the server 204 may be configured to store geographical map information associated with the geographical area 102. The geographical map information may include, for example, a digital map associated with the geographical area 102, and counts, dimensions, structures, arrangements, positions, etc. of roads included in the road network 106, the buildings 104, the interface locations 110, exercise routes, and bike lanes on the plurality of routes/roads in the geographical area 102, and/or the like. The server 204 may transmit the geographical map information to the system 114 at a predefined frequency or when the system 114 transmits a request to the server 204 to obtain the geographical map information.

The server 204 may be further configured to store historical information associated with counts of the users 112 (i.e., the users not on vehicles) on the plurality of roads/routes in the geographical area 102 at different times of a day, different times of a year, different temperature or weather conditions, and/or the like. As an example, the server 204 may store historical information that indicates that on Wednesdays at 8 AM, the walker/biker density in proximity to the interface locations 110 is typically higher than at other times on Wednesdays. As another example, the server 204 may store historical information that indicates that the walker/biker density on one or more roads/routes in the road network 106 is typically higher in summers than in winters. As yet another example, the server 204 may store historical information that indicates that the walker/biker density on a specific road/route in the road network 106 is typically higher during evening times than on other roads/routes, as the specific road/route may include one or more popular restaurants. The server 204 may transmit the historical information to the system 114 at a predefined frequency or when the system 114 transmits a request to the server 204 to obtain the historical information.

The server 204 may be further configured to store information associated with planned events on or in proximity to the plurality of routes in the geographical area 102. The planned events may be, for example, farmer markets, bike events, marathons, concerts, shows, movies, sport events, etc. The information associated with the planned events may include, for example, event start time, event time duration, event location in the geographical area 102, and/or the like. The server 204 may transmit the information associated with the planned events to the system 114 at a predefined frequency or when the system 114 transmits a request to the server 204 to obtain the information associated with the planned events.

The network 206 illustrates an example communication infrastructure in which the connected devices discussed in various embodiments of this disclosure may communicate. The network 206 may be and/or include the Internet, a private network, public network or other configuration that operates using any one or more known communication protocols such as, for example, transmission control protocol/Internet protocol (TCP/IP), Bluetooth®, BLE, Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The system 114 may include a transceiver 210, a processor 212 and a memory 214. The transceiver 210 may be configured to transmit/receive signals/information/data to/from external systems and devices including the vehicles 108, the user device 202, the server 204, a plurality of user devices and/or wearable devices associated with the users 112, sensor suites installed at the buildings 104 and infrastructure in the geographical area 102, and/or the like, via the network 206.

The processor 212 may be disposed in communication with one or more memory devices disposed in communication with the respective computing systems (e.g., the memory 214 and/or one or more external databases not shown in FIG. 2). The processor 212 may utilize the memory 214 to store programs in code and/or to store data for performing aspects in accordance with the disclosure. The memory 214 may be a non-transitory computer-readable storage medium or memory storing a program code that enables the processor 212 to perform operations in accordance with the present disclosure. The memory 214 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the memory 214 may include a plurality of databases including, but not limited to, a historical information database 216, a geographical map database 218 and an event information database 220. The historical information database 216 may store the historical information associated with counts of the users 112 (i.e., the users not on vehicles) on the plurality of roads/routes in the geographical area 102 that the system 114 may obtain from the server 204. Further, the geographical map database 218 may store the geographical map information associated with the geographical area 102, and the event information database 220 may store the information associated with the planned events on or in proximity to the plurality of routes in the geographical area 102 that the system 114 may obtain from the server 204.

In operation, the vehicle user 208 may transmit a request to the transceiver 210 when the vehicle user 208 desires the system 114 to identify a travel route for the vehicle 108*a* from a vehicle user's current or source location (e.g., a current location associated with the vehicle 108*a*) to a destination location. The request may indicate a vehicle user desire to identify the travel route that may potentially minimize vehicle interaction with the users 112. Stated another way, the vehicle user 208 may transmit the request to the transceiver 210 when the vehicle user 208 desires the system 114 to identify a travel route that may potentially minimize a probability associated with the vehicle 108*a* encountering the users 112 on the route. The vehicle user 208 may transmit the request to the transceiver 210 via the user device 202 or the HMI 116. In some aspects, in addition to the request described above, the vehicle user 208 may transmit (via the user device 202 or the HMI 116)) information associated with the destination location (e.g., the destination location address) and the acceptable additional trip distance or time duration that the vehicle user 208 accepts to traverse/spend on the route between the source location and the destination location, as described above in conjunction with FIG. 1.

The transceiver 210 may receive the information described above (collectively referred to as "user inputs") from the vehicle user 208 via the user device 202 or the HMI 116. In addition or responsive to receiving the user inputs, the transceiver 210 may receive a current or source location associated with the vehicle user 208 or the vehicle 108*a* via the user device 202 and/or the vehicle 108*a* (e.g., via the GPS receiver associated with the vehicle 108*a*). The transceiver 210 may transmit the received user inputs and the source location to the processor 212.

The transceiver 210 may further receive one or more additional information that the transceiver 210 may transmit to the memory 214 for storage purpose and/or to the processor 212. Examples of such information is described below, which should not be construed as limiting.

In some aspects, the transceiver 210 may receive the geographical map information, the historical information associated with the counts of the users 112 on the plurality of roads/routes in the geographical area 102, and the information associated with the planned events on or in proximity to the plurality of routes in the geographical area 102 from the server 204 via the network 206. The transceiver 210 may transmit the information received from the server 204 to respective memory databases for storage purpose and/or to the processor 212.

The transceiver 210 may further receive real-time user locations of a plurality of users (e.g., the users 112) in the geographical area 102 from respective user devices associated with the users 112. In some aspects, if a user may be travelling/moving slowly in the geographical area 102 (e.g., with a speed of less than 2-4 miles per hour), determined via the user's real-time location, it may be inferred that the user may not be in a vehicle and hence may be the user 112 (i.e., the user of interest). In further aspects, the transceiver 210 may receive information associated with exercise schedules associated with the users 112, and/or information indicating whether one or more users 112 may be jogging or exercising on the plurality of routes in the geographical area 102 from fitness or healthcare applications that may be installed on the user devices associated with the users 112.

The transceiver 210 may additionally receive real-time user location information or real-time information associated with the user presence on the plurality of routes in the geographical area 102 from the server 204, the vehicles 108 and/or public transport vehicles on the plurality of routes (e.g., via the vehicle cameras/sensors and V2V communication), the sensor suites installed in the buildings 104, shops, schools and malls, or infrastructure in the geographical area 102, and/or the like.

In some aspects, the real-time information associated with the user presence on the plurality of routes in the geographical area 102 may be identified via, e.g., cameras, thermal detection sensors, and other sensors installed in the buildings 104, shops, schools and malls. A person ordinarily skilled in the art may appreciate that a large group of users 112 may have a unique thermal signature, as opposed to a single user or a single vehicle in the geographical area 102. The real-time information associated with the user presence received from the sensor suites may also indicate whether one or more users 112 may be walking/moving close to the road in the geographical area 102 (e.g., at an edge of a pavement) or away from the road. In some aspects, the sensor suites, as described herein, may include Radio Detection and Ranging (radar) sensors, Light Detection and Ranging (lidar) sensors, thermal detection sensors, cameras, and/or the like.

In further aspects, the real-time information associated with the user presence on the plurality of routes in the geographical area 102 may be identified via population or crowd meters that may be installed in the buildings 104, shops, schools and malls. The real-time information associated with the user presence may also be identified by tracking/obtaining credit card or debit card transaction data from the buildings 104, shops, schools and malls (a higher count of such transaction data may indicate a greater count of the users 112 on the plurality of routes in the geographical area 102), tracking school start and end times, movie start and end times, and/or the like. The transceiver 210 may transmit the received information described above to the processor 212.

In additional aspects, the transceiver 210 may receive the real-time information associated with the user presence on the plurality of routes in the geographical area 102 via social networking applications that may be installed in the user devices associated with the users 112. As an example, if a party or a get-together may be planned on a specific route in the geographical area 102, as determined via the information received from the social networking applications, it may be inferred that the users 112 may be present on the specific route in the geographical area 102.

The transceiver 210 may further receive information associated with driving behaviors associated with the vehicles 108 on the plurality of routes in the geographical area 102. In some aspects, the driving behaviors may indicate whether the vehicles 108 may be travelling/moving slowly (e.g., with an average speed of less than 5 or 10 miles per hour) on the road network 106 or not moving slowly, or stopped on the road network 106 (e.g., at a stop sign/intersection). In an exemplary aspect, if a vehicle may be travelling slowly or stopped at a stop sign/intersection for a long time duration, it may indicate that the vehicle may be stopped at the stop sign/light to allow the users 112 to cross the road (or the vehicle may be taking a turn), thereby indicating the user presence in proximity to the road in the geographical area 102. The driving behavior information may be used by the system 114 to identify one or more zones in the road network 106 where the probability of identifying the users 112 may be high (and hence should not be taken by the user 208 to travel from the source location to the destination location). The transceiver 210 may receive the information associated with the driving behaviors associated with the vehicles 108 from the vehicles 108, the server 204, and/or the sensor suites installed in the buildings 104 and/or the infrastructure in the geographical area 102. The transceiver 210 may transmit the received information described above to the processor 212.

The processor 212 may obtain the user inputs, the source location, and the information described above from the transceiver 210. Responsive to obtaining the user inputs, the processor 212 may identify the destination location where the vehicle user 208 may desire to reach based on the user inputs. The processor 212 may then determine a set of potential routes, from the plurality of routes, in the geographical area 102 between the source location and the destination location. Stated another way, the processor 212 may determine a set of potential routes connecting the source and destination locations that the vehicle user 208 may take to reach to the destination location.

Responsive to determining the set of potential routes, the processor 212 may determine a route distance between the source location and the destination location associated with each potential route by using the geographical map information obtained from the server 204 (and stored in the geographical map database 218). The processor 212 may additionally determine a route travel time between the source location and the destination location associated with each potential route based on real-time traffic information in the geographical area 102 that the processor 212 may obtain from the server 204, the vehicles 108 (e.g., via V2V communication), and/or the buildings 104 and infrastructure in the geographical area 102 (e.g., via V2I communication).

The processor 212 may further estimate a count of the users 112 (or "user count") and a count of the interface locations 110 in each potential route based on one or more information that the processor 212 obtains from the transceiver 210 (as described above). As an example, the processor 212 may estimate the count of the interface locations 110 in each potential route based on the geographical map information that may be obtained from the server 204 (and stored in the geographical map database 218).

In some aspects, the processor 212 may estimate the user count in each potential route based on at least one of the historical information associated with counts of the users 112 on the plurality of roads/routes in the geographical area 102 at different times of a day, different times of a year, different temperature or weather conditions, and/or the like. In this case, the processor 212 may correlate a current time, temperature conditions, weather conditions, and/or the like when the processor 212 obtains the user inputs from the vehicle user 208 with the historical information to estimate the user count in each potential route.

The processor 212 may further estimate the user count in each potential route based on the information associated with the planned events, the information associated with the exercise routes/bike lanes, the information associated with the exercise schedule of each user 112, the real-time user location of each user 112, the real-time information associated with the user presence in the geographical area 102, and/or the information associated with driving behaviors associated with the vehicles 108, which the processor 212 may obtain from the transceiver 210, as described above.

In some aspects, the processor 212 may determine a time duration of no vehicle movement for one or more vehicles (e.g., when the vehicles may not be moving), from the plurality of vehicles 108, based on the information associated with driving behaviors associated with the vehicles 108. The processor 212 may estimate the user count in each potential route based on the time duration. As an example, if the determined time duration indicates that the vehicle has not moved for a long time duration (i.e., a time duration greater than a predefined threshold time duration), the processor 212 may estimate that a probability of user presence may be high at the vehicle location and hence the user count may also be high. In further aspects, the processor 212 may determine one or more zones between the source location and the destination location with a high expected probability of interaction with the users 112, based on the driving behaviors. The processor 212 may ensure that the route recommended to the user 208 does not include the determined zones.

Responsive to estimating the user count and the count of the interface locations 110 in each potential route, the processor 212 may calculate a route score for each potential route based on the estimated counts of the users 112 and the interface locations 110. The processor 212 may calculate the route score by using Artificial Intelligence (AI) or neural network based algorithms, or by using one or more predefined mathematical expressions. An example mathematical expression to calculate the route score is illustrated below:

$$\begin{aligned}\text{Route Score} = {} & A1(\text{Estimated Count of Walkers})^{B1} + A2(\text{Estimated Count of Bikers})^{B2} + \\ & A3(\text{Estimated Count of Interface Locations})^{B3} + \\ & A4(\text{Actual Count of Walkers as determined by sensor data})^{B4} + \\ & A5(\text{Actual Count of Bikers as determined by sensor data})^{B5} + \\ & A6(\text{Population density on the route})^{B6} \ldots\end{aligned}$$

In the example mathematical expression illustrated above, the coefficients (A1, B1, A2, B2, etc.) may be pre-set by the vehicle user 208 and/or a system or vehicle manufacturer. In other aspects, the coefficients may be determined and developed over time by using AI or neural network based algorithms.

A person ordinarily skilled in the art may appreciate from the mathematical expression and the description described above that a route having a low route score may have less probability or chances of user presence in the route, and hence less probability of vehicle interaction with the users 112.

Responsive to calculating the route score for each potential route, the processor 212 may correlate the route score, the route distance and the route travel time for each potential route with the acceptable additional trip distance or time duration that the vehicle user 208 accepts to traverse between the source location and the destination location, to determine a "recommended potential route" that has the least route score and the additional trip distance or time duration is less than the acceptable additional trip distance or time duration provided by the vehicle user 208. For example, if the vehicle user 208 desires not to travel more than 10 miles extra or travel for more than 15 minutes extra on a route with less probability of interaction with the users 112, the processor 212 may determine a route, from the set of potential routes, as the recommended potential route that does not require the vehicle user 208 to travel more than 10 miles extra or travel for more than 15 minutes extra and that has the least route score.

Figure 3:
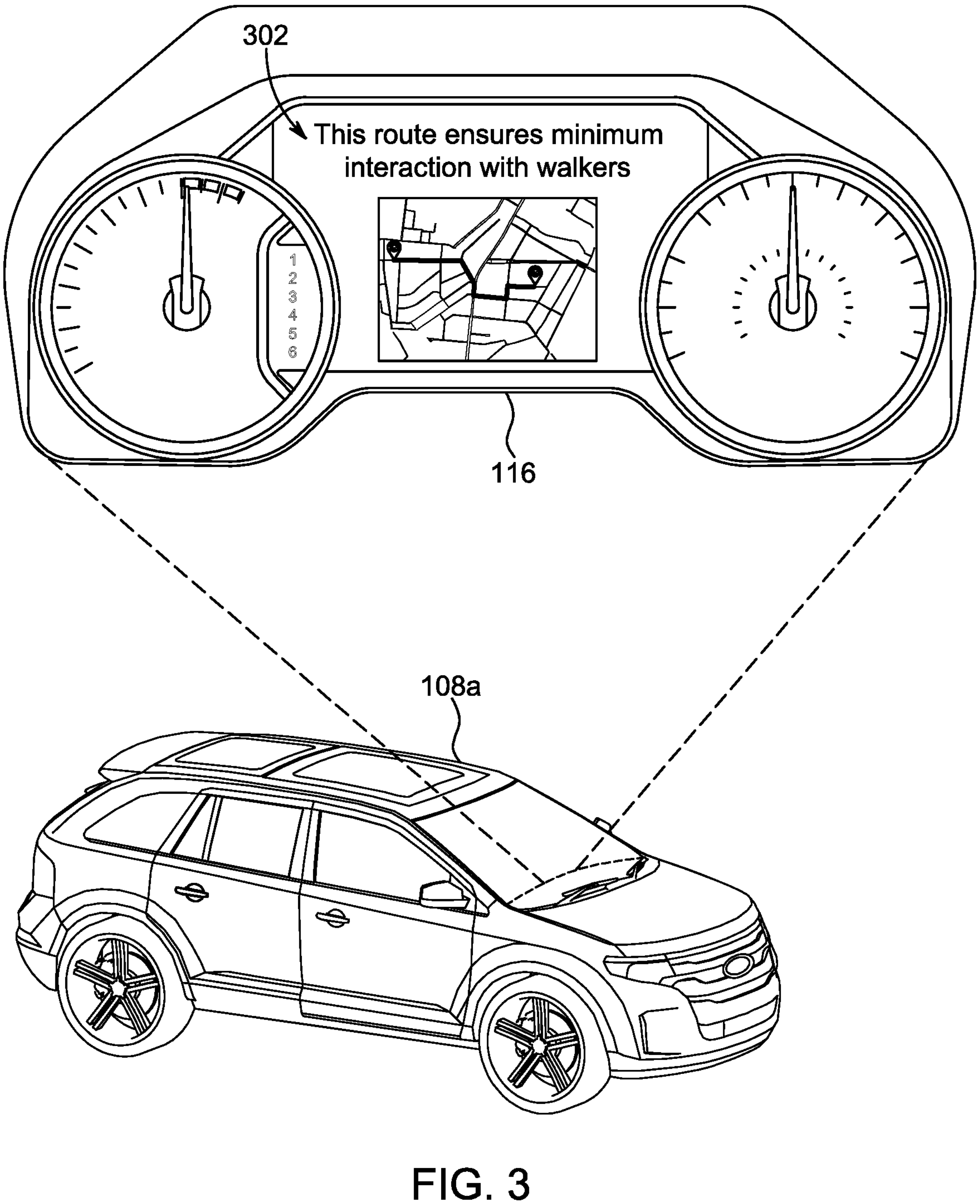
FIG. 3 depicts a snapshot of a vehicle Human-Machine Interface (HMI) screen in accordance with the present disclosure.

Responsive to determining the recommended potential route, the processor 212 may output information associated with the recommended potential route via the user device 202 and/or the HMI 116, as shown in view 302 of FIG. 3. The information associated with the recommended route may include, for example, a digital map associated with the geographical area 102 indicating/highlighting the recommended potential route, turn-by-turn instructions associated with the recommended potential route, and/or the like. In this manner, the system 114 provides or determines a travel route for the vehicle user 208 that may offer less probability of vehicle interaction with the users 112, and that may not require the vehicle user 208 to travel substantial extra miles or travel for substantial extra time duration.

In some aspects, the system 114 may adjust the potential route and/or suggest other routes when the vehicle user 208 may be driving the vehicle 108*a* on the recommended potential route, based on real-time traffic conditions, changing density of the users 112 in the geographical area 102, and/or the like.

In further aspects, if a difference between a route score for the fastest route between the source and destination locations and the least route score may be less than a predefined threshold, the processor 212 may recommend the fastest route to the vehicle user 208, as opposed to recommending the route with the least route score.

Figure 4:
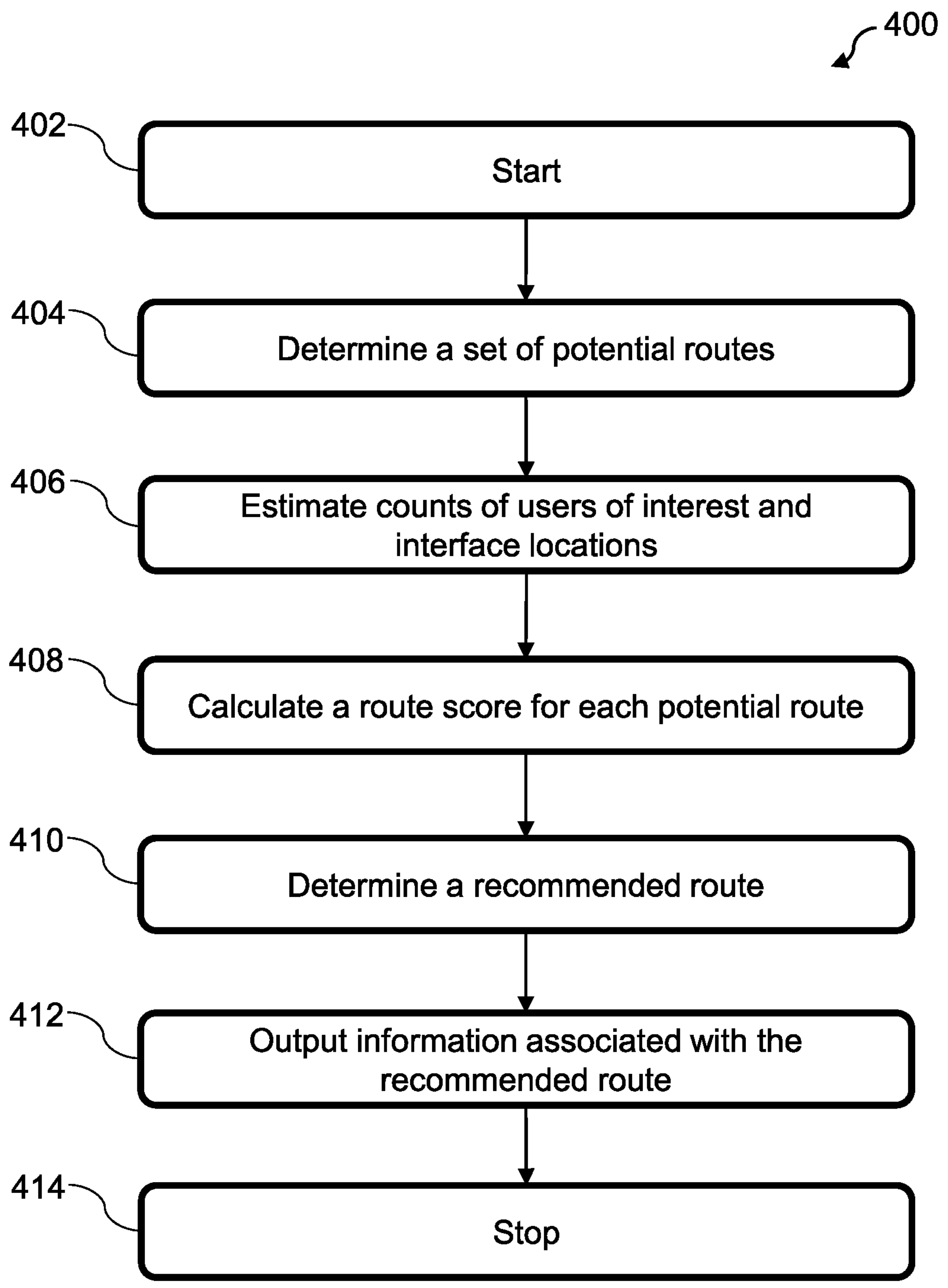
FIG. 4 depicts a flow diagram of an example route planning method in accordance with the present disclosure.

FIG. 4 depicts a flow diagram of an example route planning method 400 (or method 400) in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include determining, by the processor 212, the set of potential routes, from the plurality of routes, between the source location and the destination location in the geographical area 102 based on the user inputs. At step 406, the method 400 may include estimating, by the processor 212, the user count and the count of the interface locations 110 in each potential route based on the historical information and the information associated with the counts of the interface locations 110 on the plurality of routes in the geographical area 102.

At step 408, the method 400 may include calculating, by the processor 212, a route score for each potential route based on the estimated counts of the users 112 and the interface locations 110. At step 410, the method 400 may include determining, by the processor 212, a recommended potential route, from the set of potential routes, based on the route score for each potential route and the user inputs. At step 412, the method 400 may include outputting, by the processor 212, information associated with the recommended potential route to the user device 202 and/or the HMI 116.

At step 414, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A route planning system comprising:

a memory that stores historical information associated with counts of users of interest on a plurality of routes in a geographical area;

a transceiver that receives user inputs and information associated with counts of interface locations on the plurality of routes, wherein the transceiver receives at least one of real-time information associated with presence of users of interest in the plurality of routes from sensor suites installed in at least one of buildings and infrastructure in the geographical area via vehicle-to-infrastructure (V2I) communication, and information associated with driving behaviors of a plurality of vehicles on the plurality of routes via at least one of vehicle-to-vehicle (V2V) communication and vehicle-to-infrastructure (V2I) communication; and a processor communicatively coupled with the transceiver and the memory, wherein the processor in conjunction with the transceiver is configured to:

receive a source location from at least one of a user device and a vehicle;

determine a set of potential routes, from the plurality of routes, between the source location and a destination location in the geographical area based on the user inputs;

estimate a count of users of interest and a count of interface locations in each route, from the set of potential routes, based on the historical information, the information associated with the counts of interface locations, and at least one of the real-time information associated with presence of users of interest and the information associated with driving behaviors;

calculate a score for each route, from the set of potential routes, based on the count of users of interest and the count of interface locations in each route;

determine a recommended route, from the set of potential routes, based on the score for each route and the user inputs; and output information associated with the recommend route.

2. The route planning system of claim 1, wherein the user inputs comprise at least one of a request to identify a route that potentially minimizes interaction with users of interest, the destination location and an acceptable additional trip distance or duration that a user accepts to traverse between the source location and the destination location.

3. The route planning system of claim 1, wherein the transceiver receives the user inputs from at least one of a user device or a vehicle Human-Machine Interface (HMI), and wherein the processor outputs the information associated with the recommend route to at least one of the user device and the vehicle HMI.

4. The route planning system of claim 1, wherein the users of interest comprise at least one of walkers and bikers.

5. The route planning system of claim 1, wherein the historical information is further associated with at least one of a time of day, a time of year, temperature conditions, and weather conditions.

6. The route planning system of claim 1, wherein the transceiver is further configured to receive information associated with planned events on the plurality of routes, information associated with exercise routes on the plurality of routes, and information associated with exercise schedule of the users of interest on the plurality of routes.

7. The route planning system of claim 6, wherein the processor is further configured to estimate the count of users of interest in each route, from the set of potential routes, based on at least one of the information associated with planned events, the information associated with exercise routes and the information associated with exercise schedule.

8. The route planning system of claim 1, wherein the transceiver is further configured to receive a real-time user location of each user of interest of the users of interest, and wherein the processor is further configured to estimate the count of users of interest in each route, from the set of potential routes, based on the real-time user location of each user of interest.

9. The route planning system of claim 8, wherein the transceiver receives the real-time user location of each user of interest from a user device associated with each user of interest.

10. The route planning system of claim 1, wherein the transceiver is further configured to receive real-time information associated with presence of users of interest in the plurality of routes from at least one of vehicles and public transport on the plurality of routes, buildings, shops, schools and malls in proximity to the plurality of routes, and social networking applications.

11. The route planning system of claim 10, wherein the processor is further configured to estimate the count of users of interest in each route, from the set of potential routes, based on the real-time information associated with the presence of users of interest.

12. The route planning system of claim 1, wherein the transceiver is further configured to receive information associated with driving behaviors of a plurality of vehicles on the plurality of routes, and wherein the processor is further configured to estimate the count of users of interest in each route based on the information associated with driving behaviors.

13. The route planning system of claim 12, wherein the processor is further configured to:

determine a zone between the source location and the destination location with a high expected probability of interaction with the users of interest based on the driving behaviors;

determine a time duration of no vehicle movement for one or more vehicles, from the plurality of vehicles, based on the driving behaviors;

determine the recommended route based on the zone; and estimate the count of users of interest in each route based on the time duration.

14. The route planning system of claim 1, wherein the interface locations are at least one of sidewalks, walker crossings and bike lanes.

15. A route planning method comprising:

receiving a source location from at least one of a user device and a vehicle;

receiving at least one of real-time information associated with presence of users of interest in the plurality of routes from sensor suites installed in at least one of buildings and infrastructure in the geographical area via vehicle-to-infrastructure (V2I) communication, and information associated with driving behaviors of a plurality of vehicles on the plurality of routes via at least one of vehicle-to-vehicle (V2V) communication and vehicle-to-infrastructure (V2I) communication;

determining, by a processor, a set of potential routes, from a plurality of routes, between the source location and a destination location in a geographical area based on user inputs;

estimating, by the processor, a count of users of interest and a count of interface locations in each route, from the set of potential routes, based on historical information associated with counts of a plurality of users of interest on a plurality of routes in the geographical area, information associated with counts of interface locations on the plurality of routes, and at least one of the real-time information associated with presence of users of interest and the information associated with driving behaviors;

calculating, by the processor, a score for each route, from the set of potential routes, based on the count of users of interest and the count of interface locations in each route;

determining, by the processor, a recommended route, from the set of potential routes, based on the score for each route and the user inputs; and outputting, by the processor, information associated with the recommend route.

16. The route planning method of claim 15, wherein the user inputs comprise at least one of a request to identify a route that potentially minimizes interaction with users of interest, the destination location and an acceptable additional trip distance or duration that a user accepts to traverse between the source location and the destination location.

17. The route planning method of claim 15, further comprising:

obtaining information associated with planned events on the plurality of routes, information associated with exercise routes on the plurality of routes, and information associated with exercise schedule of the plurality of users of interest on the plurality of routes; and estimating the count of users of interest in each route, from the set of potential routes, based on at least one of the information associated with planned events, the information associated with exercise routes and the information associated with exercise schedule.

18. The route planning method of claim 15, further comprising:

obtaining a real-time user location of each user of interest from the plurality of users of interest; and estimating the count of users of interest in each route, from the set of potential routes, based on the real-time user location of each user of interest.

19. A non-transitory computer-readable storage medium having instructions stored thereupon which, when executed by a processor, cause the processor to:

receive a source location from at least one of a user device and a vehicle;

receive at least one of real-time information associated with presence of users of interest in the plurality of routes from sensor suites installed in at least one of buildings and infrastructure in the geographical area via vehicle-to-infrastructure (V2I) communication, and information associated with driving behaviors of a plurality of vehicles on the plurality of routes via at least one of vehicle-to-vehicle (V2V) communication and vehicle-to-infrastructure (V2I) communication;

determine a set of potential routes, from a plurality of routes, between the source location and a destination location in a geographical area based on user inputs;

estimate a count of users of interest and a count of interface locations in each route, from the set of potential routes, based on historical information associated with counts of a plurality of users of interest on a plurality of routes in the geographical area, information associated with counts of interface locations on the plurality of routes, and at least one of the real-time information associated with presence of users of interest and the information associated with driving behaviors;

calculate a score for each route, from the set of potential routes, based on the count of users of interest and the count of interface locations in each route;

determine a recommended route, from the set of potential routes, based on the score for each route and the user inputs; and output information associated with the recommend route.

* * * * *